(12) United States Patent
Raslambekov

(10) Patent No.: US 10,888,397 B1
(45) Date of Patent: *Jan. 12, 2021

(54) METHOD AND SYSTEM FOR DENTAL BOUNDARY DETERMINATION

(71) Applicant: Oxilio Ltd, Larnaca (CY)

(72) Inventor: Islam Khasanovich Raslambekov, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,637

(22) Filed: Jun. 23, 2020

Related U.S. Application Data

(63) Continuation of application No. 16/703,471, filed on Dec. 4, 2019, now Pat. No. 10,695,147.

(51) Int. Cl.
*A61C 7/00* (2006.01)
*G06T 17/20* (2006.01)

(52) U.S. Cl.
CPC .............. *A61C 7/002* (2013.01); *G06T 17/20* (2013.01); *G06T 2207/20081* (2013.01); *G06T 2207/20084* (2013.01); *G06T 2207/30036* (2013.01)

(58) Field of Classification Search
CPC ......... A61C 7/002; G06T 15/00; G06T 17/00; G06T 17/20; G06T 17/30; G06T 19/00; G06T 19/003; G06T 2207/20081; G06T 2207/20084; G06T 2207/30036
USPC ........................................................ 345/419
See application file for complete search history.

(56) References Cited

U.S. PATENT DOCUMENTS

| | | | |
|---|---|---|---|
| 7,004,754 B2 | 2/2006 | Kaufmann et al. | |
| 7,844,429 B2 | 11/2010 | Matov et al. | |
| 9,629,698 B2 | 4/2017 | Lior et al. | |
| 10,192,003 B2 | 1/2019 | Somasundaram | |
| 10,206,759 B2 | 2/2019 | Salah et al. | |
| 2006/0228009 A1 | 10/2006 | Fidrich et al. | |
| 2009/0092301 A1* | 4/2009 | Jerebko | G06T 7/12 382/128 |
| 2017/0100207 A1 | 4/2017 | Wen et al. | |
| 2018/0182101 A1* | 6/2018 | Petersen | G06T 7/13 |

(Continued)

FOREIGN PATENT DOCUMENTS

| | | |
|---|---|---|
| WO | 2000019928 A1 | 4/2000 |
| WO | 2018029276 A1 | 2/2018 |

OTHER PUBLICATIONS

Mouritsen, "Automatic segmentation of teeth in digital dental models", a thesis, University of Alabama at Birmingham, 2013, retrieved on Jan. 8, 2020 from https://pdfs.semanticscholar.org/4480/82b554871b390f88edbeef67cc22386bbc3c.pdf?_ga=2.194856686.212862255.1578513093-1912737744.1578513093.

(Continued)

*Primary Examiner* — Sae Won Yoon
(74) *Attorney, Agent, or Firm* — BCF LLP

(57) ABSTRACT

Methods, systems, and apparatuses are described for determining a boundary between teeth and gingiva of an archform and/or between teeth and other teeth. Curves may be defined on the surface of teeth and gingiva in the archform. A predicted likelihood parameter that each of the points corresponds to the boundary between the teeth and gingiva may be determined. A smoothing function and the predicted likelihood parameter may be used to determine a boundary point for each curve. The boundary points may be connected to form the boundary between the teeth and gingiva.

20 Claims, 14 Drawing Sheets

(56) References Cited

U.S. PATENT DOCUMENTS

| | | | |
|---|---|---|---|
| 2018/0303581 A1 | 10/2018 | Martz et al. | |
| 2018/0333226 A1 | 11/2018 | Tsai et al. | |
| 2019/0180443 A1* | 6/2019 | Xue | G06K 9/66 |
| 2019/0333224 A1 | 10/2019 | Liu et al. | |
| 2019/0357997 A1* | 11/2019 | Shi | A61C 7/002 |
| 2020/0022790 A1 | 1/2020 | Fisker | |

OTHER PUBLICATIONS

Kumar, Yokesh, et al. "Improved segmentation of teeth in dental models." Computer-Aided Design and Applications 8.2 (2011): 211-224 (Year: 2011).

Mairaj, Danish, Stephen D. Wolthusen, and Christoph Busch. "Teeth segmentation and feature extraction for odontological biometrics." 2010 Sixth International Conference on Intelligent Information Hiding and Multimedia Signal Processing. IEEE, 2010 (Year: 2010).

Kronfeld, Thomas, David Brunner, and Guido Brunnett. "Snake-based segmentation of teeth from virtual dental casts." Computer-Aided Design and Applications 7.2 (2010): 221-233 (Year: 2010).

\* cited by examiner

METHOD AND SYSTEM FOR DENTAL BOUNDARY DETERMINATION

CROSS-REFERENCE

The present application is a continuation of U.S. patent application Ser. No. 16/703,471 filed Dec. 4, 2019, the entirety of which is incorporated by reference.

FIELD

The present technology relates to identifying boundaries between teeth and gingiva, and boundaries between teeth and teeth.

BACKGROUND

An orthodontic treatment plan may be created for a patient. The movement of the patient's teeth based on an applied orthodontic treatment may be modelled as part of the creation of the treatment plan. The modelling may be based on images of the patient's teeth. The images may have been obtained using an intraoral scanner.

In certain modelling methods, movement of individual teeth are modelled and therefore it may be advantageous to segment the teeth from one another, and/or segment the teeth from the gingiva. Typically, a dentist (or another medical professional) may define the boundary between the teeth and the gingiva and/or the boundaries between the individual teeth.

This process may be time consuming. The user-defined boundaries may be inaccurate.

SUMMARY

It is an object of the present technology to ameliorate at least some of the inconveniences present in the prior art.

Embodiments of the present technology have been developed based on developers' appreciation that automatic determination of a boundary between teeth and gingiva and/or boundaries between teeth and other teeth may be beneficial to users.

Embodiments of the present technology have been developed based on developers' appreciation that automatic determination of a boundary between teeth and gingiva and/or boundaries between teeth and other teeth may be more accurate than manual definition of those boundaries.

According to one aspect, there is provided a method of determining a boundary between a plurality of teeth and gingiva of an archform. The method may be executable by an electronic device. A three-dimensional (3D) digital model of the archform may be received. The 3D model may comprise a representation of the gingiva and the plurality of teeth. A plurality of curves may be defined for each tooth of the plurality of teeth. Each curve of the plurality of curves may cross the boundary between the plurality of teeth and the gingiva. For each point of a plurality of points of each of the plurality of curves, an indication of curvature of the respective curve at each point may be determined. A predicted likelihood parameter may be determined for each point of the plurality of points. The predicted likelihood parameter may be determined based on the indication of curvature corresponding to the respective point. The predicted likelihood parameter may indicate a predicted likelihood that a respective point corresponds to the boundary between the plurality of teeth and the gingiva. A single point may be selected, for each curve of the plurality of curves, as a boundary point corresponding to the boundary between the plurality of teeth and the gingiva of the archform. A smoothing function may be used to select the points. The predicted likelihood parameter of the respective points may be used to select the points.

In certain embodiments, the plurality of curves may comprise a plurality of 3D curves. The plurality of curves may be converted to two dimensional (2D) curves. In certain embodiments the indication of curvature may be determined based on the 2D curves.

In certain embodiments, a tangent to surface angle may be determined for each point of the plurality of points.

In certain embodiments, a curve of the plurality of curves may be determined to comprise a loop. The curve comprising the loop may be omitted from further analysis.

In certain embodiments, a curve of the plurality of curves may be determined to correspond to two or more teeth. The curve corresponding to the two or more teeth may be omitted from further analysis.

In certain embodiments, a portion of each curve corresponding to a tooth head may be removed from the respective curve.

In certain embodiments, a function may be generated that predicts the likelihood that each point of the plurality of points corresponds to the boundary between the plurality of teeth and the gingiva.

In certain embodiments, average curvature properties corresponding to the plurality of teeth may be determined. Average curvature properties corresponding to the gingiva may be determined. The average curvature properties corresponding to the plurality of teeth and the average curvature properties of the gingiva may be input as training features to a machine learning algorithm (MLA). The MLA may generate a function that predicts the likelihood that each point of the plurality of points corresponds to the boundary between the plurality of teeth and the gingiva. The predicted likelihood parameter may be determined by executing the MLA.

In certain embodiments, a first curve of the plurality of curves may correspond to an inner side of a tooth of the plurality of teeth, and a second curve of the plurality of curves may correspond to an outer side of the tooth.

In certain embodiments, a derivative of each curve of the plurality of curves may be determined.

In certain embodiments, a sum of the predicted likelihood parameters may be maximized to select the boundary points. A curvature of a curve connecting the boundary points may be minimized to select the boundary points.

In certain embodiments, a curve connecting the boundary points may be determined. A 3D digital model of the archform and the curve connecting the boundary points may be output for display.

In certain embodiments, a shortest path algorithm may be applied to determine a curve connecting the boundary points.

In certain embodiments, a curve may be analyzed to interpolate corrective points to a boundary region of the curve that has missing determined boundary points. A portion of the curve may be determined, the portion corresponding to a given tooth of the plurality of teeth. The portion of the curve may be merged for the given tooth of the plurality of teeth between the missing determined boundary points to define the curve. Closest segments may be identified between neighboring portions of the curve. A shortest path algorithm may be applied to the closest segments to smoothen a transition between them to form the curve.

In certain embodiments, a selection indicating a number of curves to define for each tooth may be received.

In certain embodiments, the plurality of points on each of the plurality of curves may be selected.

From another aspect, there is provided an apparatus for determining a boundary between a plurality of teeth and gingiva of an archform. In certain embodiments, the apparatus may comprise at least one processor and memory comprising executable instructions. When the executable instructions are executed by the at least one processor, the apparatus may determine a boundary between a plurality of teeth and gingiva of the archform. The apparatus may receive a three-dimensional (3D) digital model of the archform. The 3D model may comprise a representation of the gingiva and the plurality of teeth. The apparatus may define a plurality of curves for each tooth of the plurality of teeth. Each curve of the plurality of curves may cross the boundary between the plurality of teeth and the gingiva. For each point of a plurality of points of each of the plurality of curves, the apparatus may determine an indication of curvature of the respective curve at each point. The apparatus may determine a predicted likelihood parameter for each point of the plurality of points. The apparatus may determine the predicted likelihood parameter based on the indication of curvature corresponding to the respective point. The predicted likelihood parameter may indicate a predicted likelihood that a respective point corresponds to the boundary between the plurality of teeth and the gingiva. The apparatus may select a single point, for each curve of the plurality of curves, as a boundary point corresponding to the boundary between the plurality of teeth and the gingiva of the archform. The apparatus may use a smoothing function to select the points. The apparatus may use the predicted likelihood parameter of the respective points to select the points.

The methods, systems, and apparatuses described herein may reduce the amount of time and/or computing resources used to determine a boundary between teeth and gingiva and/or a boundary between teeth and teeth. The methods, systems, and apparatuses described herein may define a more accurate boundary than a user-determined boundary between teeth and gingiva and/or teeth and teeth. The boundary line may be used when creating various orthodontic appliances, and a more accurate boundary line may lead to more effective orthodontic appliances. In the context of the present specification, unless expressly provided otherwise, a computing device and/or computer system may refer, but is not limited to, an "electronic device," an "operation system," a "system," a "computer-based system," a "controller unit," a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first," "second," "third," etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object might not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale.

DETAILED DESCRIPTION

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

A digital model (hereinafter referred to as "model") of a patient's archform may be generated based on images and/or scans of the patient's mouth, such as images and/or scans of the teeth and gingiva of the patient. The model may comprise portions of teeth and gingiva. The model may comprise a three dimensional (3D) mesh, in which a plurality of vertices are connected to each other by edges.

The model may be analyzed to identify various portions of the archform. Boundaries between teeth and gingiva may be determined. Boundaries between teeth and teeth may be determined.

Various assumptions may be made in order to determine the boundary between teeth and gingiva. The boundary between teeth and gingiva may typically have a relatively high curvature. The gingiva may be located opposite to the tooth head. The tooth and the gingiva may have different curvature patterns from each other. This known domain information may be used to determine the boundary between teeth and gingiva and/or teeth and other teeth.

Figure 1:
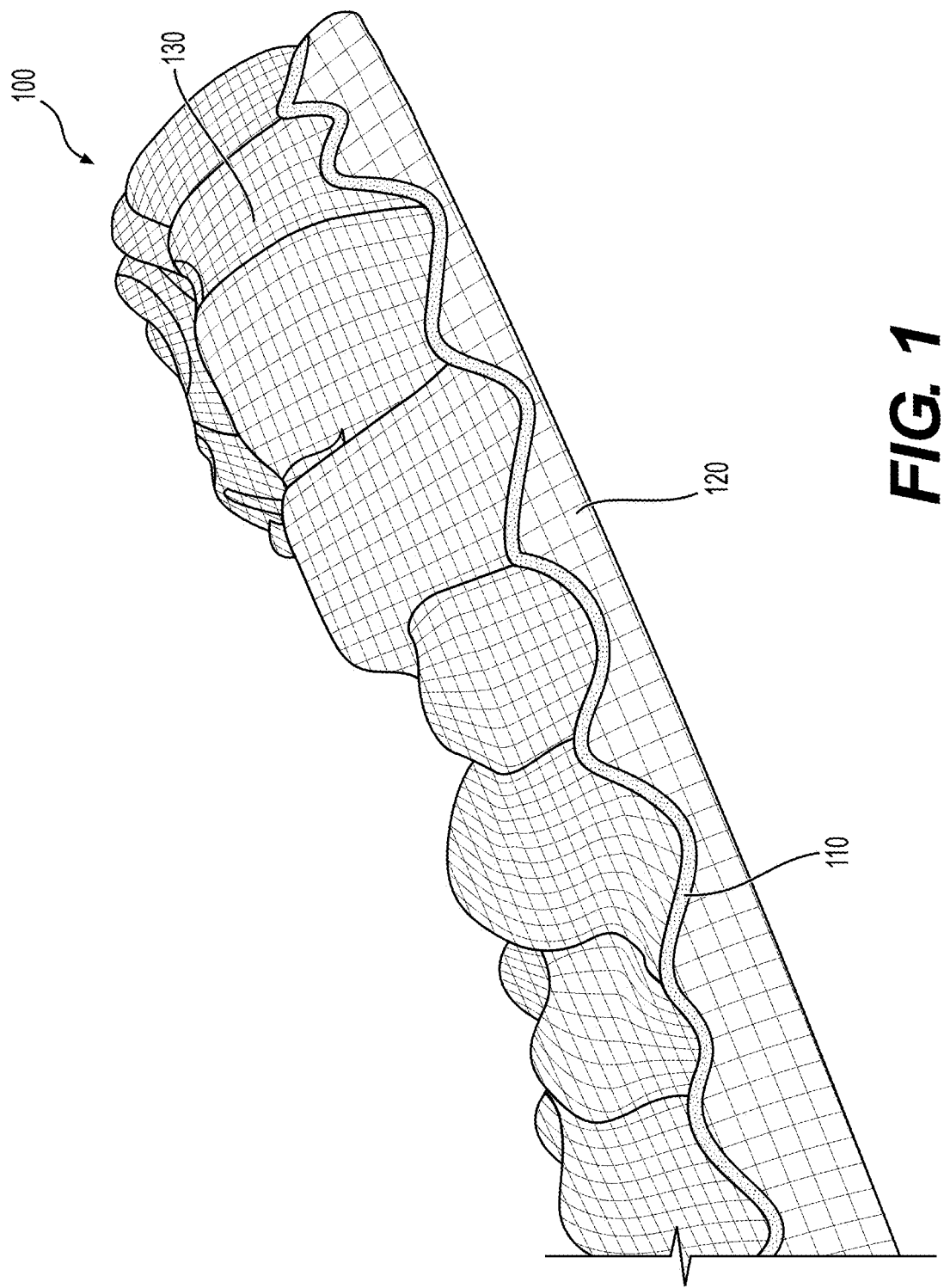
FIG. 1 shows an example of an archform mesh according to non-limiting embodiments of the present technology.

FIG. 1 shows an example of an archform mesh 100 according to non-limiting embodiments of the present technology. The archform mesh 100 is composed of vertices which are connected by edges. The archform mesh 100 represents the gingiva 120 and teeth 130 of a patient. Although the archform mesh 100 illustrates the lower part of the patient's mouth ("lower arch"), it should be understood that an archform mesh 100 may comprise a lower and/or upper portion of the patient's mouth.

A boundary 110 separates the gingiva 120 from the teeth 130. The boundary 110 may be representative of a gumline of the patient's archform. The boundary 110 may be manually identified, or drawn, by a user (such as the dentist or the like) viewing the archform mesh 100.

In accordance with the non-limiting embodiments of the present technology, the boundary 110 may be determined using various methods described herein, such as the method 200 described below and in FIGS. 2A-C. The archform mesh 100 may be generated based on one or more images, scans, and/or other collected data regarding a patient's mouth. The archform mesh 100 may also be generated based on a physical mold representing the patient's teeth and gingiva.

Figure 2A:
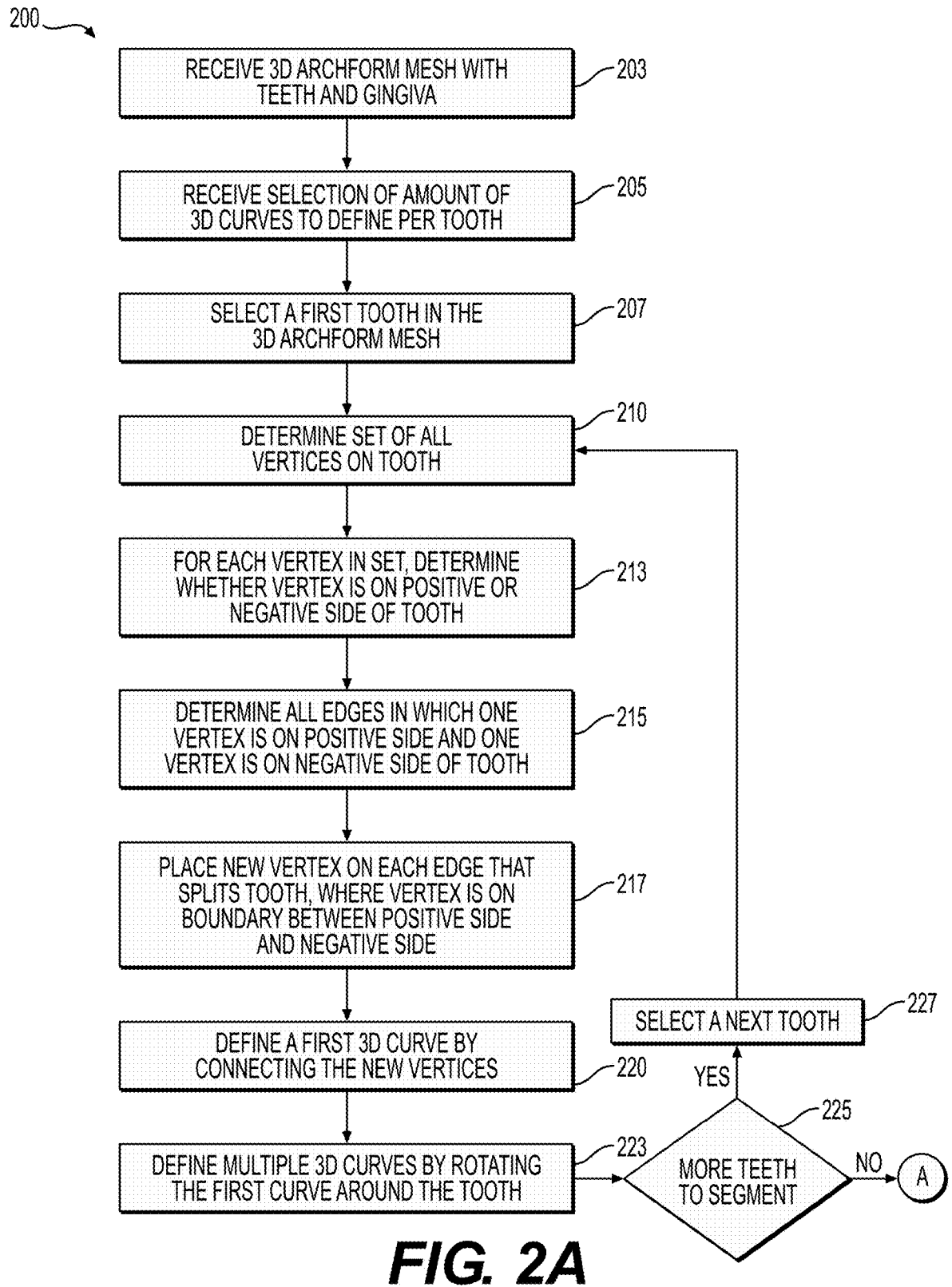
FIGS. 2A-C are flow diagrams of a method for determining boundaries in an archform according to non-limiting embodiments of the present technology.
Figure 2B:
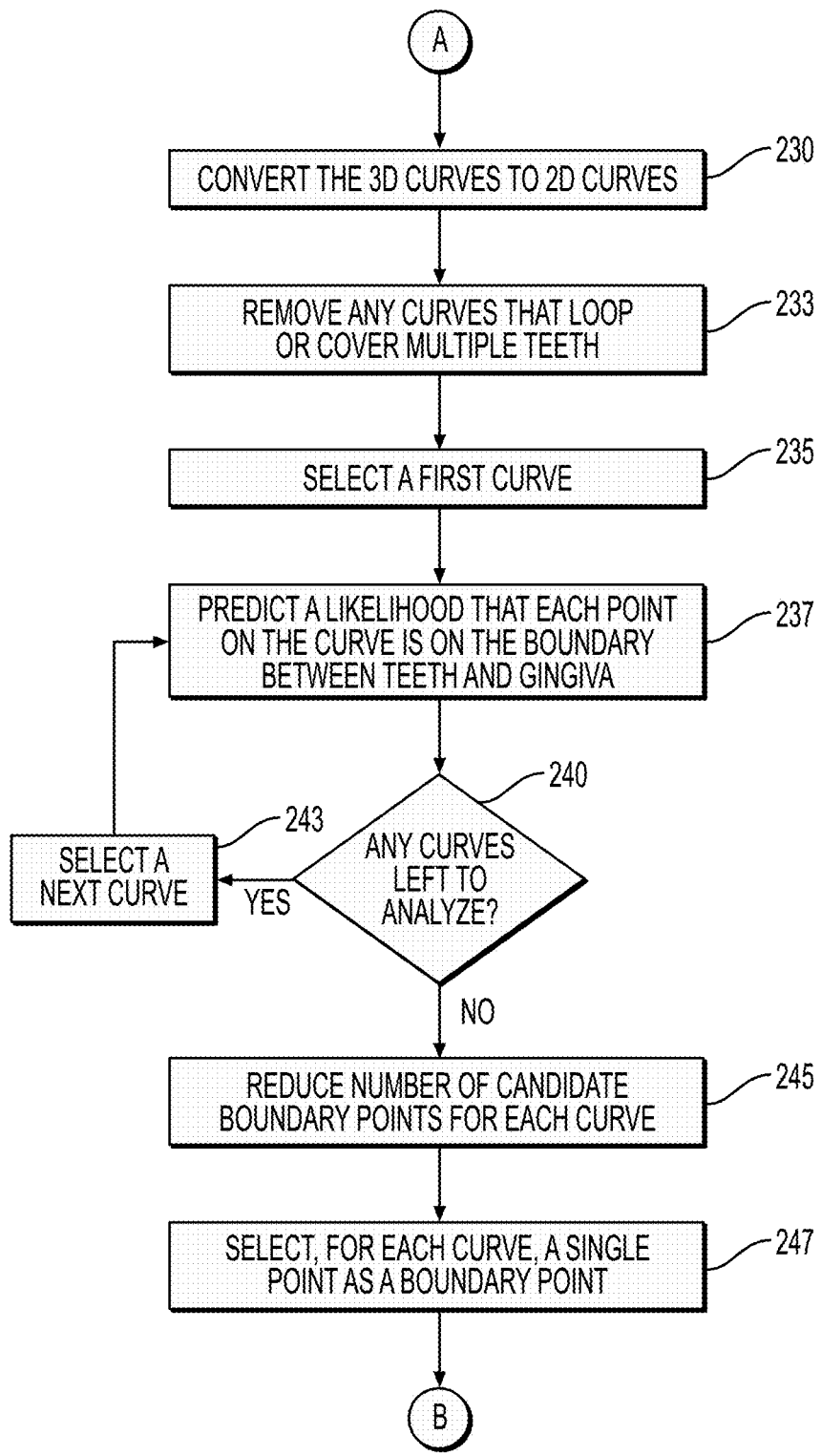
Figure 2C:
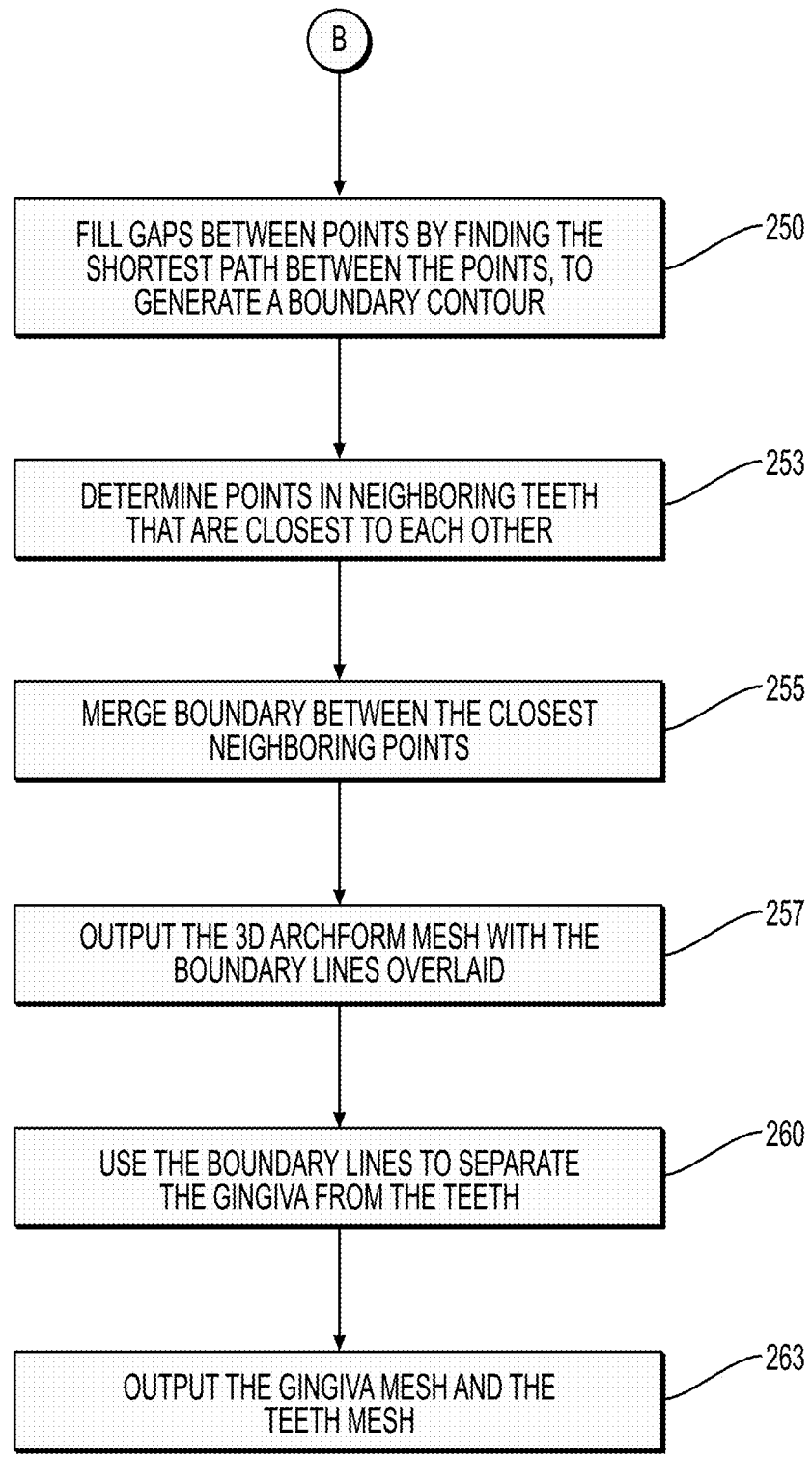

FIGS. 2A-C are flow diagrams 200 of a method for determining boundaries in an archform according to one or more illustrative aspects of the disclosure.

At step 203 a 3D archform mesh, such as the archform mesh 100, may be received. The 3D archform mesh may comprise a plurality of teeth and gingiva. The 3D archform mesh may comprise an upper and/or lower set of teeth.

At step 205 a selection of a number of 3D curves to define per tooth may be received. The selection may comprise a number of planes to define per tooth. The selection may comprise a degree interval at which the curves and/or planes are to be rotated around a vertical axis. The selection may comprise an instruction to define a same number of curves for each tooth in the archform mesh. The selection may indicate different numbers of curves for each individual tooth of the archform mesh. Although described as receiving a selection at step 205, the number of 3D curves to define may be predetermined, such as during configuration of software performing the method 200. As the number of curves defined increases, the accuracy of the determined boundary line may increase as well. But, as the number of curves defined increases, the amount of time, memory, processing cycles, and/or other computing resources used to perform all or portions of the method 200 may increase.

The number of curves to be defined may be determined rather than selected. For example the number of curves may be determined based on an amount of available memory and/or processing power. The number of curves may be determined based on a desired runtime for determining the boundary. For example a desired maximum runtime may be selected, and the amount of curves may be calculated based on determining, given a hardware configuration, the maximum amount of curves that can be defined in order to determine a boundary while satisfying the desired maximum runtime.

At step 207 a first tooth in the 3D archform mesh may be selected. The first tooth may be selected randomly. Alternatively, a pre-set order may be used for selecting the first tooth. Although the steps in FIG. 2 are described in a linear fashion, the steps may be performed in parallel manner. For example, multiple teeth may be analyzed simultaneously using the steps described below. The locations of the teeth may be automatically determined and/or manually input by a user.

At step 210 a set of all vertices of the 3D archform mesh corresponding to the current tooth may be determined. The vertices may be all of the vertices on the surface of the tooth. As described above, a vertex is a point in the 3D archform mesh at which two or more edges meet. One or more points on the surface of the tooth may be selected by a user. Two points may be selected, on opposite sides of the tooth. The two selected points may be points on opposite sides of a long axis of the tooth. An elliptical cylinder may be determined based on the user-selected points. The center of the cylinder may correspond to the vertical axis of the tooth. A set of all vertices of the mesh that fit within the cylinder may be selected as the set of all vertices corresponding to the current tooth.

At step 213 each vertex in the set may be analyzed to determine whether that vertex is on the positive or negative side of the tooth. The positive side may be the outward facing side of the tooth, and the negative side may be the inward facing side of the tooth, or vice versa. Each vertex may be labeled as a positive vertex or a negative vertex. A jaw inward vector may be calculated for each tooth, such as based on two selected points for each tooth. The jaw inward vector may be used to determine whether vertices are on the positive or negative side of the tooth. Rather than determining what side of the tooth each vertex is on, a determination may be made for each determined curve, as discussed below.

At step 215 the edges corresponding to the vertices labeled at step 213 may be analyzed. A set of edges may be identified, where each edge in the set has one vertex labeled as a positive vertex and one vertex labeled as a negative vertex. Each edge in the set of edges may cross the boundary between the positive and negative side of the tooth.

At step 217 a new vertex may be placed on each of the edges in the set of edges identified at step 215. The new vertex may be placed on the boundary between the positive and negative side of the tooth. The new vertex may be placed at the center of the edge, i.e., equidistant from the two vertices forming the edge.

Figure 3:
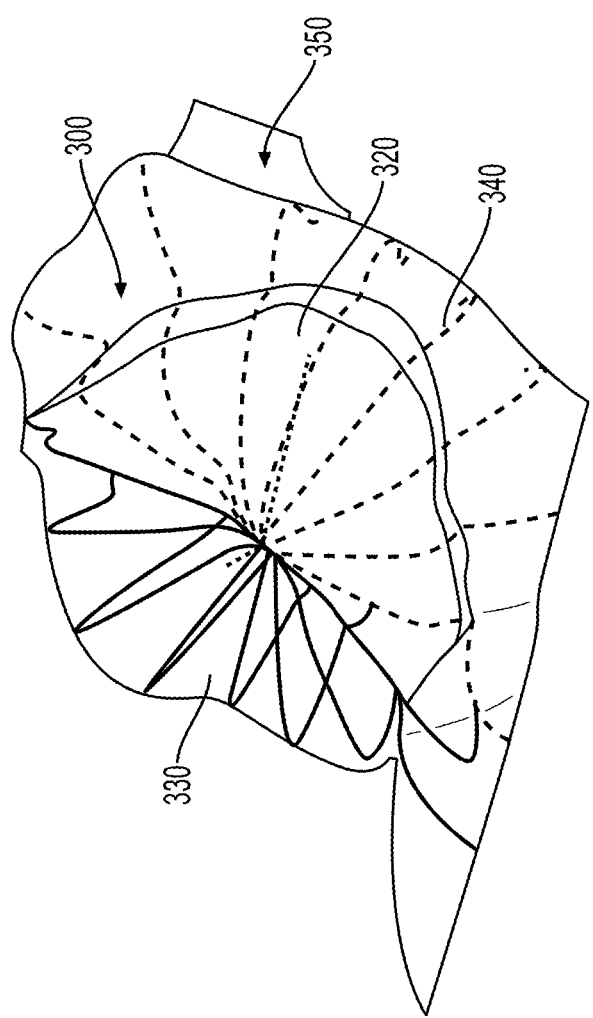
FIG. 3 shows an example of curves defined on a tooth in a circular manner according to non-limiting embodiments of the present technology.

At step 220 a first 3D curve may be defined by connecting the new vertices that were added at step 217. The 3D curve may comprise a curve that separates the positive and negative sides of the tooth. FIG. 3, described in further detail below, illustrates an example of curves on a tooth. The length of the 3D curve may be predetermined. The length of the 3D curve may be based on known anatomical features, such as an average distance between the top of a tooth and the gingiva, for example, for a given age or sex of patient.

At step 223 a plurality of 3D curves may be defined by rotating the first curve around the tooth. The step of the rotation, or angle in between the curves, may be determined based on the selected number of curves to generate per tooth received at step 205. For example if a user requests that 10 curves be generated per tooth, 36 degrees will separate each curve. A plane may be defined at step 220 and rotated around the tooth at step 223.

Figure 4:
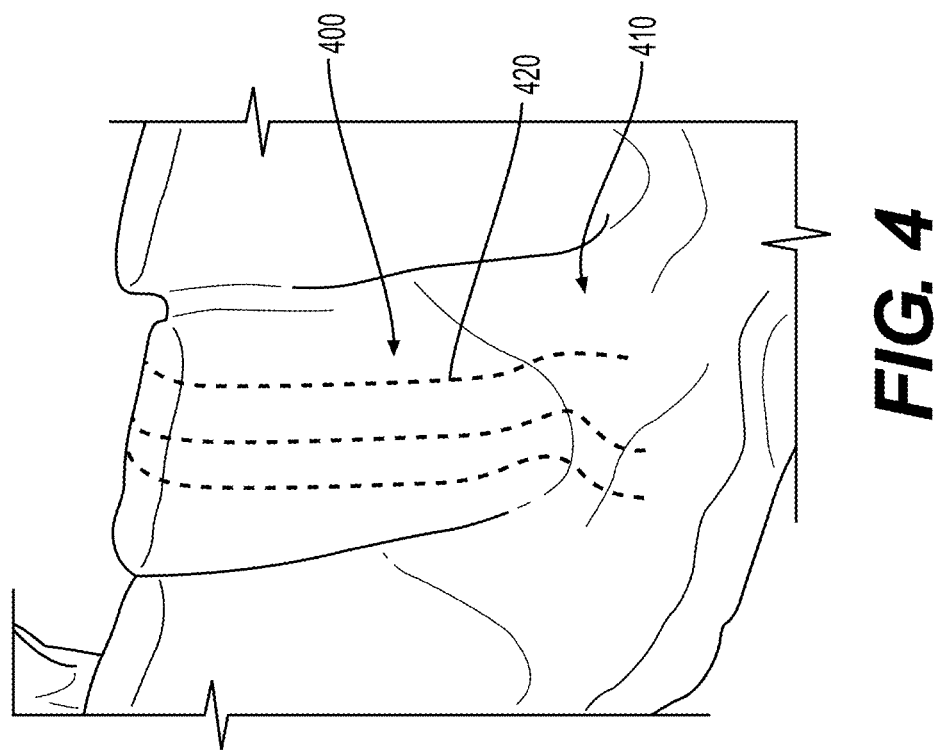
FIG. 4 shows an example of curves defined on a tooth in a horizontal manner according to non-limiting embodiments of the present technology.

Although a method of defining curves by rotation is described in the method 200, other methods of defining a set of curves may be used. Rather than rotating a curve, the curve could be shifted horizontally along the teeth to define a series of curves. FIG. 4, described in further detail below, provides an illustration of a set of curves defined via horizontal shifting.

Rather than determining a curve and rotating or shifting the curve, a set of planes may be generated. The planes may be generated in a circular manner around the tooth, or may be shifted horizontally along the tooth. The number of planes generated may be determined based on the input received at step 205. A curve may then be defined for each plane, at the points where the plane intersects the mesh edges. Two curves may be defined for each plane, one being on the positive side of the tooth and the other on the negative side of the tooth.

Each defined curve may be analyzed to determine whether that curve corresponds to the positive or negative side of the tooth. A jaw inward vector may be calculated for each curve and used to determine whether the curve corresponds to the positive or negative side of the tooth.

At step 225 a determination may be made as to whether there are additional teeth to segment in the 3D archform mesh. If there are additional teeth to segment, a next tooth may be selected at step 227 and then a set of all vertices on that tooth may be determined at step 210.

Figure 5:
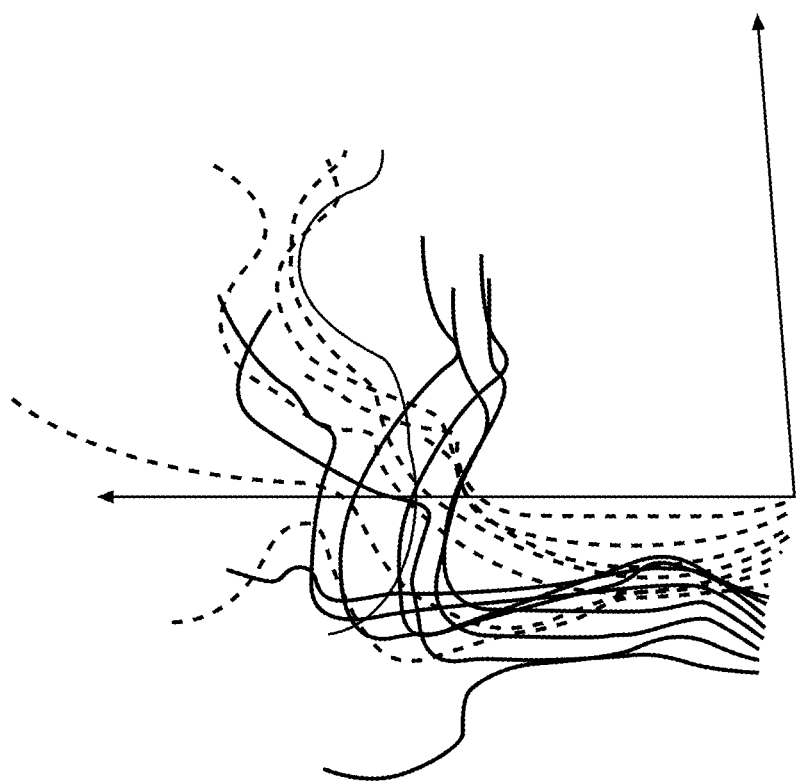
FIG. 5 shows an example of two dimensional (2D) curves according to non-limiting embodiments of the present technology.

If a determination is made at step 225 that all teeth in the 3D archform mesh have been segmented, at step 230 all of the 3D curves may be converted to two dimensional (2D) curves. FIG. 5, discussed in further detail below, illustrates 3D curves that have been converted to 2D curves. The curves, either before or after the conversion, may be modified. The length of the curves may be reduced by removing one or more sections of the curve. A section of a curve corresponding to a tooth head may be removed. The section or sections of the curve to be removed may be determined based on known anatomical data, such as an average tooth head size. The section of the curve corresponding to the tooth head may be determined based on position, tangent angles, and/or other metrics corresponding to the curve.

At step 233 the set of 2D curves may be analyzed to determine whether any of the curves comprise loops and/or whether any of the curves are on the surface of more than one tooth. Any curves that comprise loops and/or are on the surface of more than one tooth may be removed from the set of 2D curves. This analysis and removal of curves may be performed on the 3D curves prior to converting the 3D curves to 2D curves. The curves may be analyzed to determine whether any portion of the curves begin and end on a same point. If a portion of a curve begins and ends on a same point, that curve may be determined to comprise a loop.

At step 235 a first curve may be selected. Any curve may be selected as the first curve. The curve may be selected randomly. Alternatively, the curve may be selected based on a predetermined order. Although the description of the method 200 describes analyzing the curves in a linear manner, the curves may be analyzed in parallel.

At step 237 a prediction may be made, for a set of points on the curve, as to whether each point in the set is on the boundary between teeth and gingiva. The set may comprise all points on the curve or a subset of the points on the curve. The points in the set may be evenly spaced on the curve. The likelihood may be determined based on a derivative of the curve. The likelihood that a point is on the boundary may be determined based on an amount of curvature of the curve at that point. The amount of curvature may be based on a measured tangent to surface angle of the curve.

A function may be generated to predict the likelihood that a point is on the boundary between teeth and gingiva. For each point that is input to the function, the function may output a predicted likelihood that the point lies on the boundary between teeth and gingiva. Each point on the curve may be analyzed to determine an indication of the curvature of the curve at that point.

At step 240 a determination may be made as to whether all curves have been analyzed or whether there are additional curves to analyze. If there are additional curves to analyze, a next curve may be selected at step 243. For a set of points on that curve, the likelihood that each point in the set is on the boundary between teeth and gingiva may be predicted at step 237.

If all curves are determined to have been analyzed at step 240, at step 245 the number of candidate boundary points may be reduced for each curve. All points, in the set of points used for the predictions at step 237, that are below a threshold likelihood of being on the boundary may be filtered out to reduce the number of candidate boundary points. A point in the set of points having a maximum likelihood of being on the boundary may be selected. Various other methods may be used to filter out points from the sets of points used for predictions. The remaining points may be considered candidate boundary points. Step 245 is optional. Instead of filtering the boundary points all pairwise combinations of boundary points may be analyzed at step 247.

Figure 7:
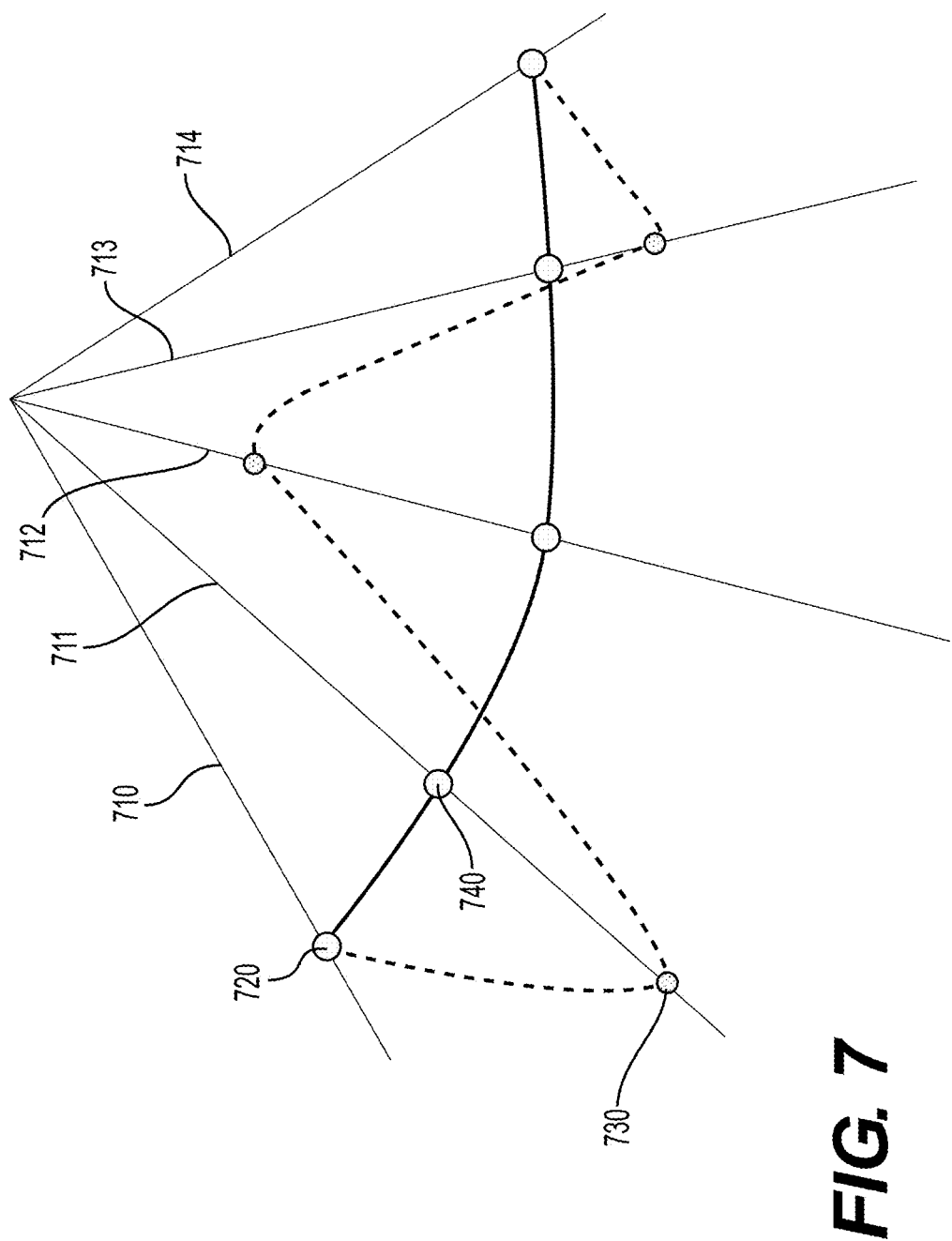
FIG. 7 shows an example of candidate boundary points according to non-limiting embodiments of the present technology.

At step 247 a single boundary point may be selected for each curve from the candidate boundary points for that curve. FIG. 7, described in further detail below, illustrates boundary points that are selected from candidate boundary points.

The boundary points may be selected by analyzing all possible combinations of candidate boundary points, or a subset of all possible combinations of candidate boundary points. One combination may then be selected, where that combination has a single boundary point on each curve. Boundary points may be selected that, when connected, form a boundary line having minimal curvature. The boundary points may be selected in order to minimize the curvature of the resulting boundary line. A shortest path algorithm may be used to select the boundary points that minimize curvature of the determined boundary line between teeth and gingiva. The shortest path algorithm may comprise the Dijkstra algorithm, a dynamic programming algorithm, and/or any other type of shortest path algorithm.

The boundary points may be selected to maximize the sum of the predicted likelihood of all points. Candidate boundary points having a higher predicted likelihood of being on the border between teeth and gingiva may be selected. The selected boundary points may be selected to minimize the curve of the boundary line while maximizing the predicted likelihood that each point is on the border between teeth and gingiva. A boundary point might not be selected for each curve. If all points for a curve were below a threshold predicted likelihood, no candidate boundary points and/or no boundary point may be selected for that curve. This "gap" in boundary points may be remedied at step 250. If a single candidate boundary points is identified for a curve, that candidate boundary point may be selected as the boundary point for that curve.

At step 250, gaps between boundary points may be filled to generate a boundary contour. For various reasons, there may be gaps in between boundary points. Curves may have been deleted from the analysis, for example if those curves comprised loops or were on more than one tooth. Boundary points might not have been determined on some curves. If an artifact from a scan or a model is distorting the boundary on a curve, a boundary point might not have been determined for that curve.

At step 253 points on neighboring teeth that are closest to each other may be determined. The two points that are closest to each other on the neighboring teeth may be labeled as interface points. Corresponding points on neighboring teeth that are below a threshold distance may be selected. The threshold distanced may be determined based on known anatomical information, such as based on an average distance between teeth.

At step 255, the boundary line separating teeth and gingiva may be merged at the interface points determined at step 253. A shortest path algorithm may be used to merge the boundary line at the two points. The line merging the two interface points may be defined on the surface of the gingiva.

Figure 9:
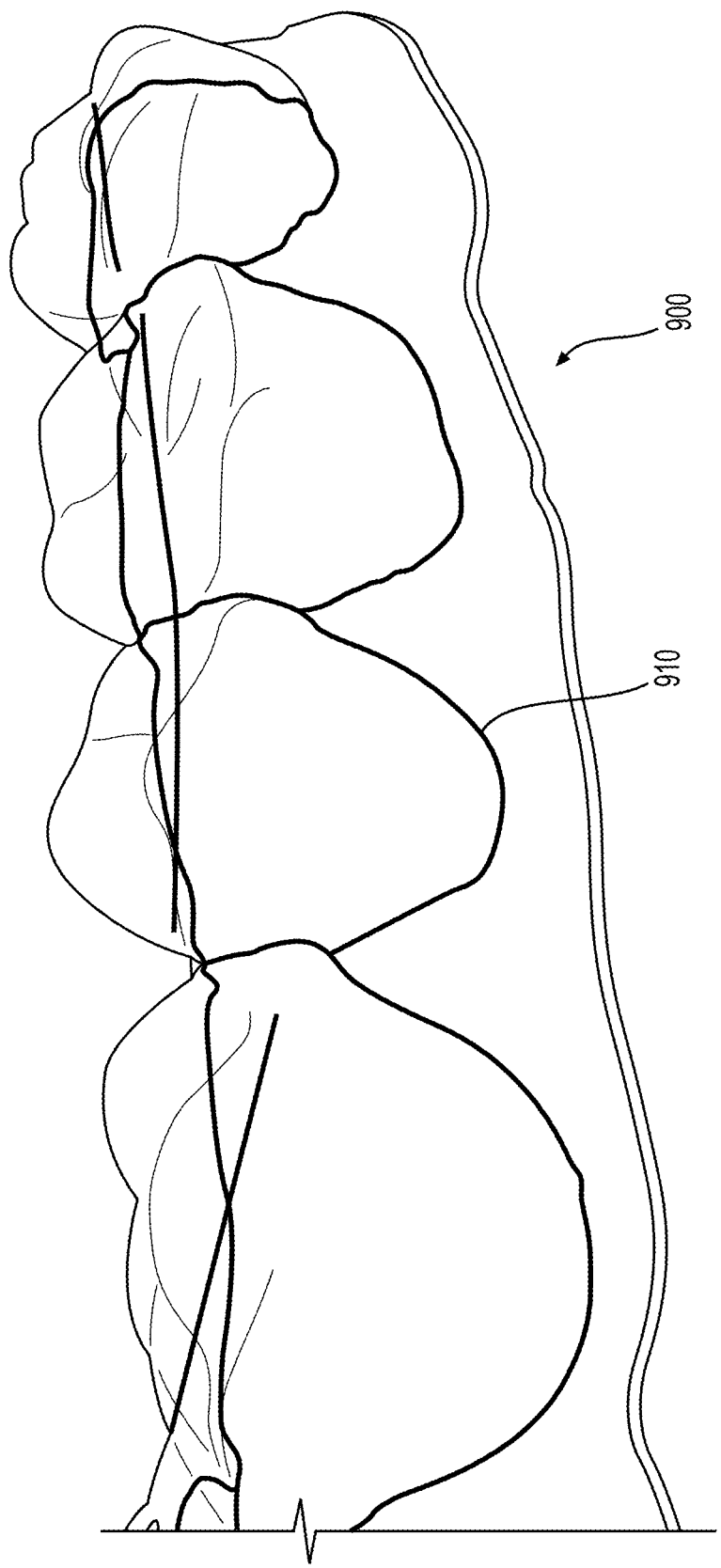
FIG. 9 shows an example of an archform display with a boundary line overlay according to non-limiting embodiments of the present technology.

At step 257 the 3D archform mesh may be output for display. The boundary line between the teeth and gingiva may be overlaid on the 3D archform mesh. If both lower and upper teeth are displayed, a lower teeth boundary line and an upper teeth boundary line may be displayed. FIG. 9, described in further detail below, is an illustration of an exemplary display of a 3D archform mesh with a boundary overlay. The display may comprise a lower set of teeth and/or an upper set of teeth.

At step 260 the boundary lines may be used to separate the teeth from the gingiva in the 3D archform mesh. A first 3D archform mesh may be formed comprising the teeth, and a second 3D archform mesh may be formed comprising the gingiva. If both upper and lower teeth are present in the 3D archform mesh received at step 203, then a first 3D archform mesh may be formed comprising the upper teeth, a second 3D mesh may be formed comprising the upper gingiva, a third 3D mesh may be formed comprising the lower teeth, and a fourth 3D mesh may be formed comprising the lower gingiva.

At step 263 the separated meshes from step 260 may be output for display. A user may be able to manipulate the displayed meshes. The user may select which meshes are displayed and/or whether the original 3D archform mesh is displayed. The user may be able to adjust the boundary line separating the teeth from the gingiva.

FIG. 3 shows an example of curves on a tooth defined in a circular manner according to non-limiting embodiments of the present technology. The tooth 300 may comprise a portion of a 3D archform mesh. For illustrative purposes, a single tooth 300 is shown in FIG. 3, rather than the entire 3D archform mesh.

The tooth 300 has a positive side 320 and a negative side 330. The positive side 320 may correspond to an outward facing side of the tooth, and the negative side 330 may correspond to an inward facing side of the tooth. The gingiva 350 surrounds the tooth 300. The boundary between tooth 300 and gingiva 350 is not illustrated in FIG. 3.

As described above in regard to FIG. 2, curves 340 may be defined for the tooth. The curves 340 may be 3D curves. The curves 340 may be drawn on the surface of the tooth. A first curve 340 may be defined, as described above and in FIG. 2, by placing vertices in the mesh on a boundary between the positive side 320 and the negative side 330 of the tooth 300. The curve may then be rotated around the tooth. In FIG. 3, curves 340 drawn in dashed lines correspond to the positive side 320 of the tooth 300, and curves 340 drawn in solid lines correspond to the negative side 330 of the the tooth 300.

The angle between curves 340, or in other words the step of the rotation, may be adjusted based on a desired number of curves 340 for each tooth 300. The length of the curves 340 may be defined based on predetermined anatomical data. The length of the curves 340 may be defined to be sufficient to cross the boundary between tooth 300 and gingiva 350.

FIG. 4 shows an example of curves on a tooth defined in a horizontal manner according to non-limiting embodiments of the present technology. As described above and in FIG. 2, curves can be defined on teeth in a circular manner, horizontal manner, and/or any other suitable manner.

Curves 420 may be defined on a tooth 400 and gingiva 410. The curves 420 may be 3D curves. The curves 420 may be similar to the curves 340, but the curves 420 may be horizontally shifted across the surface of the tooth rather than shifted in a circular fashion. The curves 420 may cross the boundary between the tooth 400 and gingiva 410. A first curve 420 may be shifted horizontally to define multiple curves 420. The distance in between curves 420 may be selected by a user and/or predefined. Although curves 420 are illustrated on a single tooth 400 in FIG. 4, curves 420 may be defined on the surface of multiple teeth. For each of the illustrated curves 420 on the positive side of the tooth 400, a corresponding curve 420 may be defined on the negative side of the tooth 400.

3D curves, such as the curves 340 and/or curves 420 may be converted to 2D curves. FIG. 5 shows an example of so-converted 2D curves according to non-limiting embodiments of the present technology. The 2D curves may then be analyzed, such as to determine the amount of curvature at various points along the curves. Curves from both the positive side and the negative side of a tooth may be converted to 2D curves and analyzed to determine curvature. In FIG. 5, curves from the positive side of the tooth are illustrated with dashed lines, and curves from the negative side of the tooth are illustrated with solid lines. A derivative may be taken of the 2D curves to determine the curvature.

Figure 6:
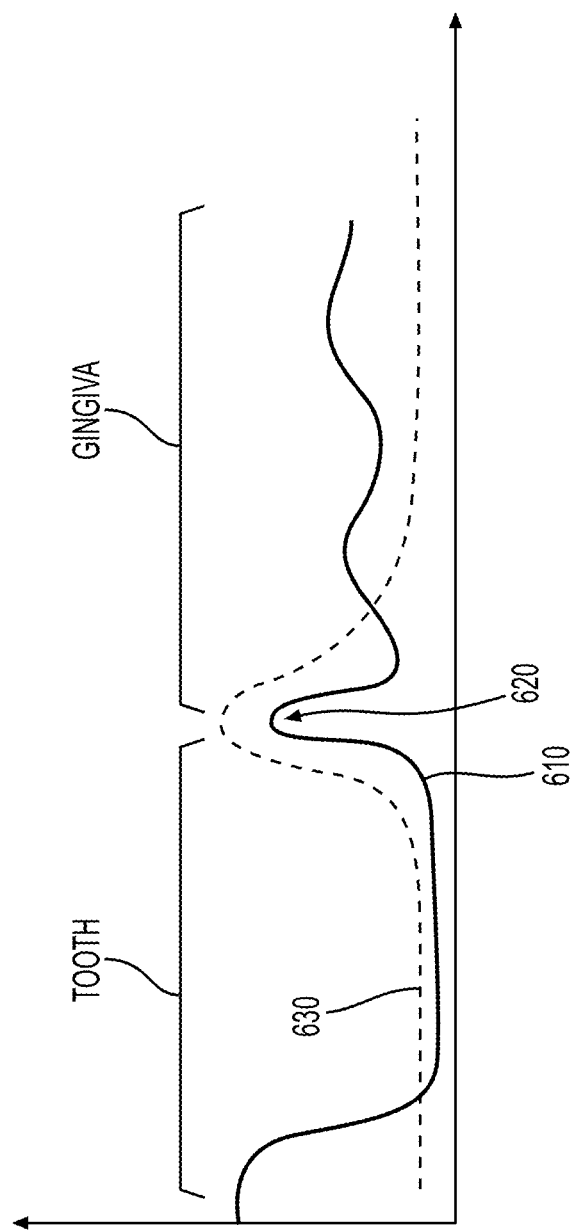
FIG. 6 shows an example of a prediction function according to non-limiting embodiments of the present technology.

FIG. 6 shows an example of a prediction function according to non-limiting embodiments of the present technology. Function 610 indicates the amount of curvature at a given point on a curve defined on the surface of a tooth and gingiva, such as the curves 340 and/or curves 420. The function 610 initially indicates that there is a large amount of curvature because the curve is crossing from the head of the tooth to the side of the tooth. After the initial increase in curvature due to the head of the tooth, the curvature increases dramatically again at point 620. This point 620 is likely at or near the boundary between tooth and gingiva. The predictor function 630 indicates the likelihood that a point on the curve is at the boundary between teeth and gingiva. As the curvature increases in the middle of the curve, the likelihood of being on the boundary also increases.

The curvature at a point on the curve may be calculated based on the tangent vector at that point, which may be the vector joining the previous and next neighbor points on the curve. The curvature of a segment may be calculated as the derivative of the tangent divided by the length of the segment. The curvature at a point may be calculated as the average curvature of neighboring segments.

FIG. 7 shows an example of candidate boundary points according to one or more illustrative aspects of the disclosure. Lines 710-714 correspond to curves defined on a tooth and gingiva, such as the curves 340 and/or curves 420. As described above and in FIGS. 2A-C, candidate boundary points may be determined for each curve based on various criteria. The curve corresponding to line 710 has a single candidate boundary point 720. Thus this candidate boundary point 720 may be selected as a boundary point.

Curve 711 has two candidate boundary points, points 730 and 740. As can be seen in FIG. 7, if the candidate boundary point 730 were selected as the boundary point, the determined boundary line would have a much higher amount of curvature. The candidate boundary point 740 is more likely to be selected as a boundary point than the candidate boundary point 730, because the determined boundary line will be much smoother if the candidate boundary point 740 is selected as a boundary point. As can be seen in FIG. 7, a single candidate boundary point may be determined for some curves, while for others multiple candidate boundary points may be determined. Although FIG. 7 illustrates an example in which at least one candidate boundary point was determined for each curve, in some instances curves might not have any candidate boundary points.

Figure 8:
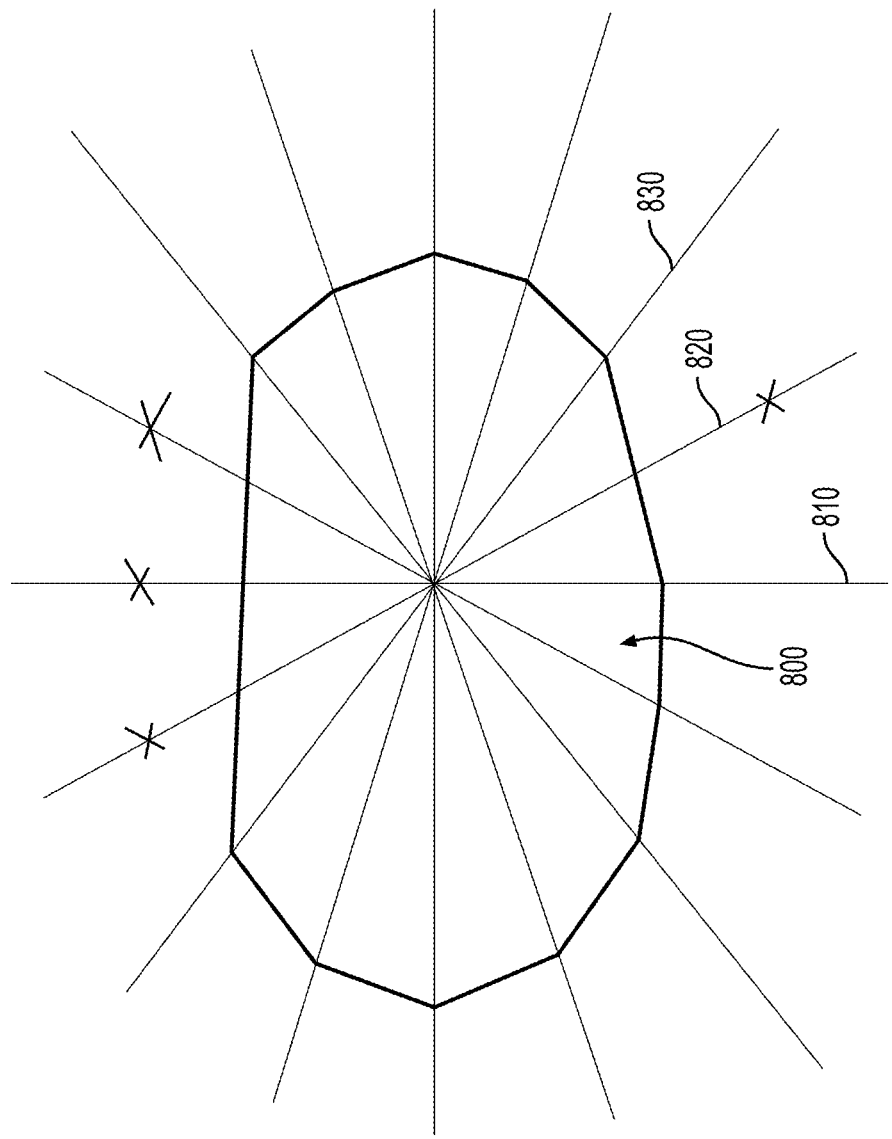
FIG. 8 shows an example of missing boundary points according to non-limiting embodiments of the present technology.

FIG. 8 shows an example of missing boundary points according to one or more illustrative aspects of the disclosure. In FIG. 8, multiple curves are defined on the surface of a tooth 800. The curves are defined in a circular manner, as described above in regards to FIGS. 2A-C and FIG. 3. After analyzing the curves, such as using steps described above in regards to FIGS. 2A-C, some of the curves might not have any candidate boundary points.

In the illustration in FIG. 8, curve 820 has no candidate boundary points. As described at step 250 of FIG. 2C, boundary points on neighboring curves 810 and 830 may be used to determine a boundary point on the curve 820. A shortest path algorithm may be used to connect the boundary points on the curves 810 and 830, thereby determining a boundary point on the curve 820. The determined boundary may trace the surface of the 3D archform.

The determined boundary may be overlaid as a boundary line on an archform display. The archform display may be a 2D archform or a 3D archform.

FIG. 9 shows an example of an archform display with a boundary line overlay according to one or more illustrative aspects of the disclosure. The archform display comprises a 3D archform. The 3D archform 900 may comprise teeth and gingiva. The 3D archform 900 may be displayed to a user. A boundary line 910 may be overlaid on the 3D archform to indicate the determined boundary between teeth and gingiva. A user viewing the display illustrated in FIG. 9 may be able to confirm the accuracy of the determined boundary and/or make adjustments to the determined boundary.

The 3D archform may be representative of the archform of the patient, or of an orthodontic appliance, such as an aligner, to be applied to the patient. The determined boundary teeth and gingiva of the patient may subsequently be used in making the orthodontic appliance.

Figure 10:
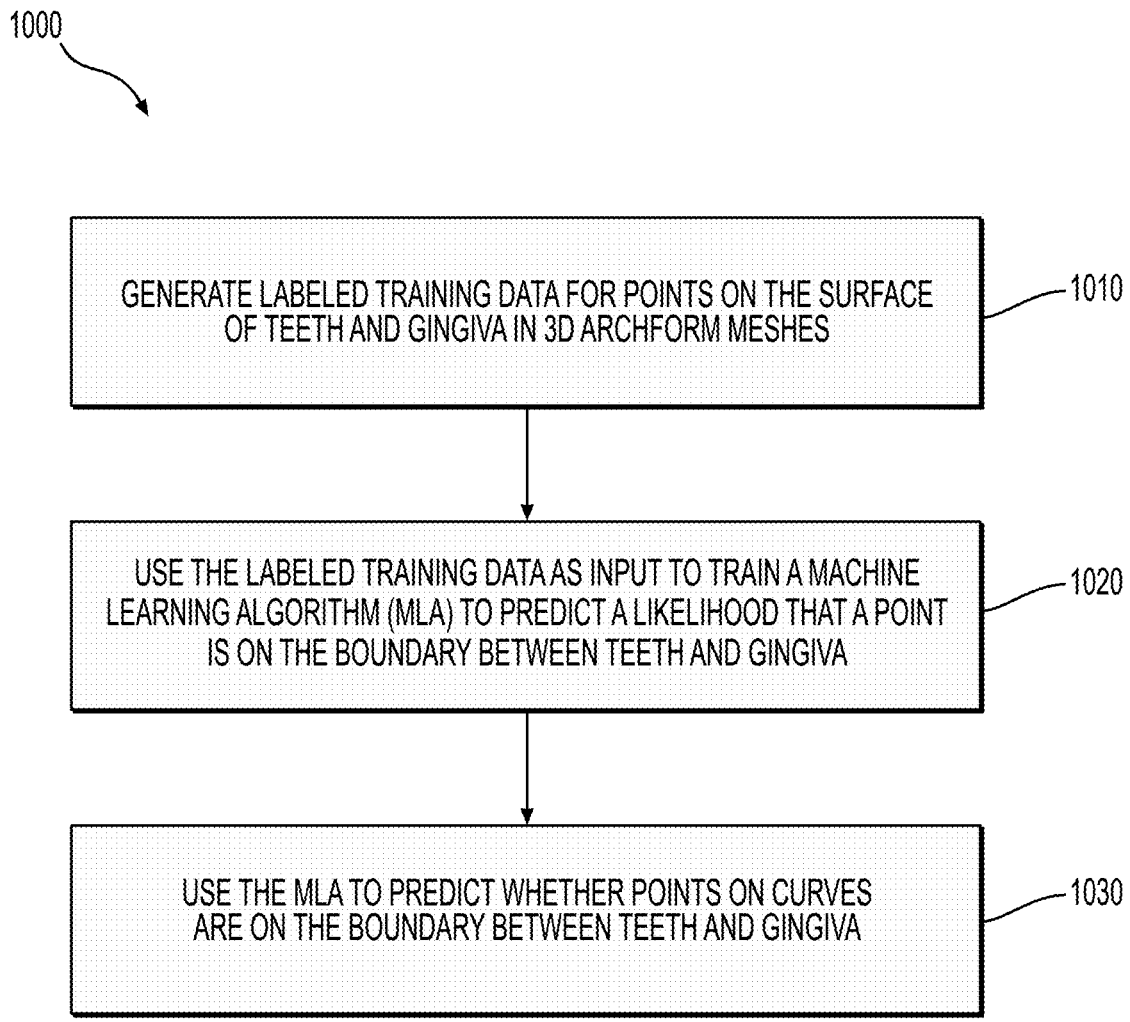
FIG. 10 is a flow diagram of a method for predicting boundary points using a machine learning algorithm (MLA) according to non-limiting embodiments of the present technology.

FIG. 10 is a flow diagram of a method 1000 for predicting boundary points using a machine learning algorithm (MLA) according to non-limiting embodiments of the present technology.

At step 1010 labeled training data may be generated for points on the surface of the teeth and gingiva. The labeled training data may originate from one or more 3D archform meshes. The labeled training data may correspond to a plurality of patients. The training data may comprise, for each point, a location on a curve and/or a curvature corresponding to that location. The label may comprise an indication of whether the respective point is on a tooth, whether the respective point is on gingiva, and/or whether the respective point is on the border between the teeth and gingiva. The label may be input by a user. The labeled training data may comprise average curvature properties corresponding to one or more teeth, average curvature properties of gingiva, and/or any combination thereof. The training data may be stored in a database and/or any other suitable data structure.

At step 1020 the labeled training data may be used as input to train a machine learning algorithm (MLA). The MLA may be trained to predict a likelihood that a point is on a boundary between teeth and gingiva. The MLA may be trained to predict a likelihood that a point is on a tooth and/or on the gingiva. The MLA may be a neural network, regression algorithm, tree model, Markov model, and/or any other suitable MLA. The average curvature properties for one or more teeth and/or average curvature properties for gingiva may be input to the MLA as training features.

At step 1030 the MLA may be used to predict whether points on curves are on the boundary between teeth and gingiva. The MLA may take the curve and the coordinates of the point as input, and may output a predicted likelihood that the curve is on the boundary between teeth and gingiva. The MLA may take a plurality of curves as input and predict, for one or more points on the curves, a predicted likelihood that each point is on the boundary between teeth and gingiva.

All or a portion of the steps described in the method 1000 may replace the steps 235, 237, 240, and/or 243 in the method 200, described above and in FIG. 2.

Figure 11:
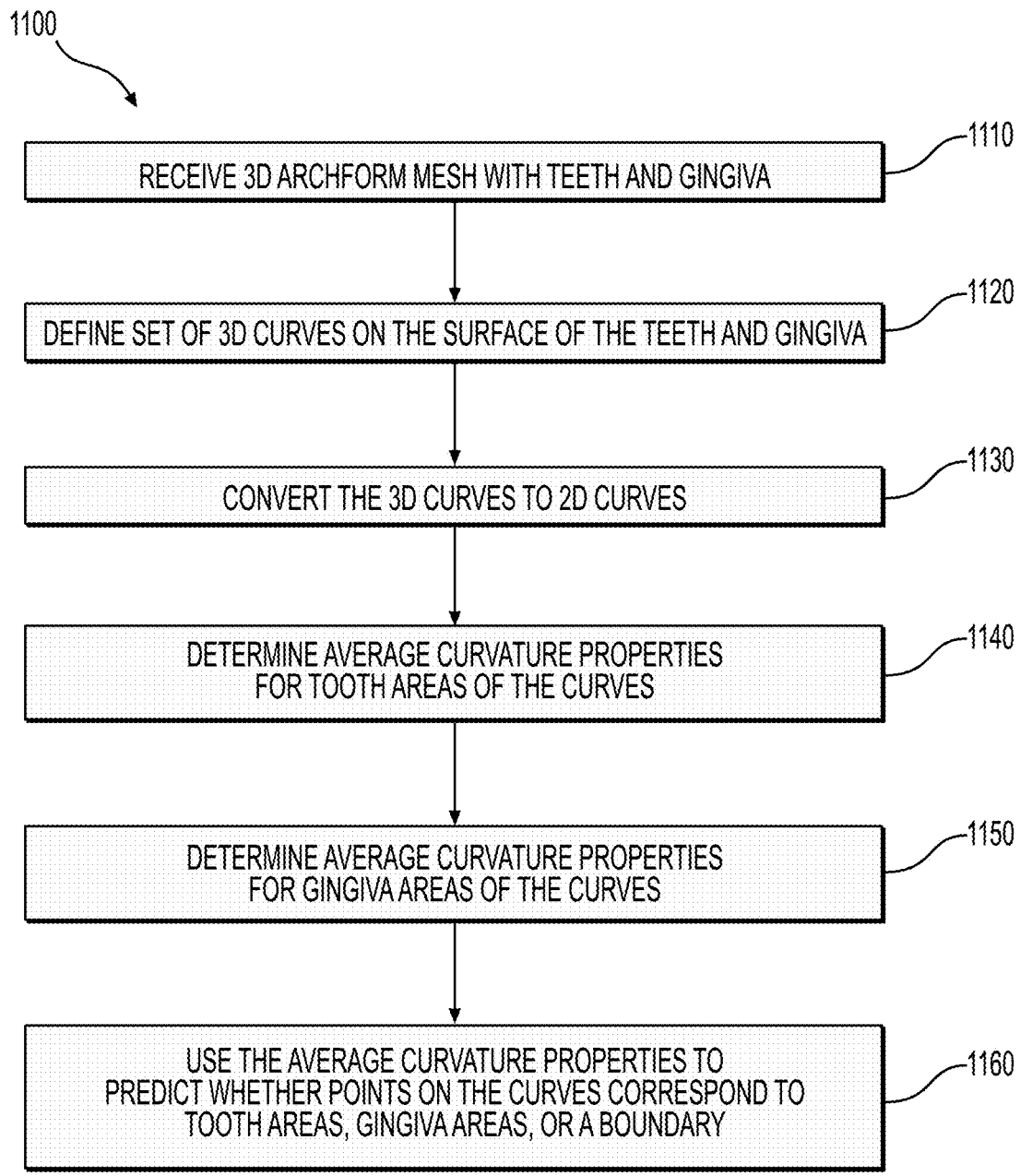
FIG. 11 is a flow diagram of a method for using average curvature properties to predict boundary points according to non-limiting embodiments of the present technology.

FIG. 11 is a flow diagram of a method for using average curvature properties to predict boundary points according to one or more illustrative aspects of the disclosure.

At step 1110 a 3D archform mesh with teeth and gingiva may be received. At step 1120 a set of the 3D curves may be defined on the surface of the teeth and gingiva. At step 1130 the 3D curves may be converted into 3D curves. Actions performed at step 1110, 1120, and/or 1130 may be similar to those described above in regard to steps 203-230 of the method 200.

At step 1140 one or more curvature properties for tooth areas of the curves may be determined. At step 1150 one or more curvature properties for gingiva areas of the curves may be determined. Points on the curves may be clustered into tooth areas and/or gingiva areas. The points may be clustered based on curvature of the curve at each point, location on the curves, distance to vertical axis, tangent vector direction, and/or other suitable parameters. After the clustering is performed, average curvature properties may be determined for each cluster.

At step 1160 the average curvature properties may be used to predict whether points on the curves correspond to tooth areas, gingiva areas, and/or a boundary between teeth and gingiva. A function may be generated that predicts the likelihood that each point on the curve is on the border between teeth and gingiva. The function may be generated based on the average curvature properties of the tooth areas and/or the average curvature properties of the gingiva areas.

The methods 200, 1000, and/or 1100, or one or more steps thereof, may be embodied in computer-executable instructions that are stored in a computer-readable medium, such as a non-transitory computer-readable medium. The methods 200, 1000, and/or 1100, or one or more steps thereof, may be performed by one or more computing devices or entities, such as the computing device 1200 described below and in FIG. 12.

Figure 12:
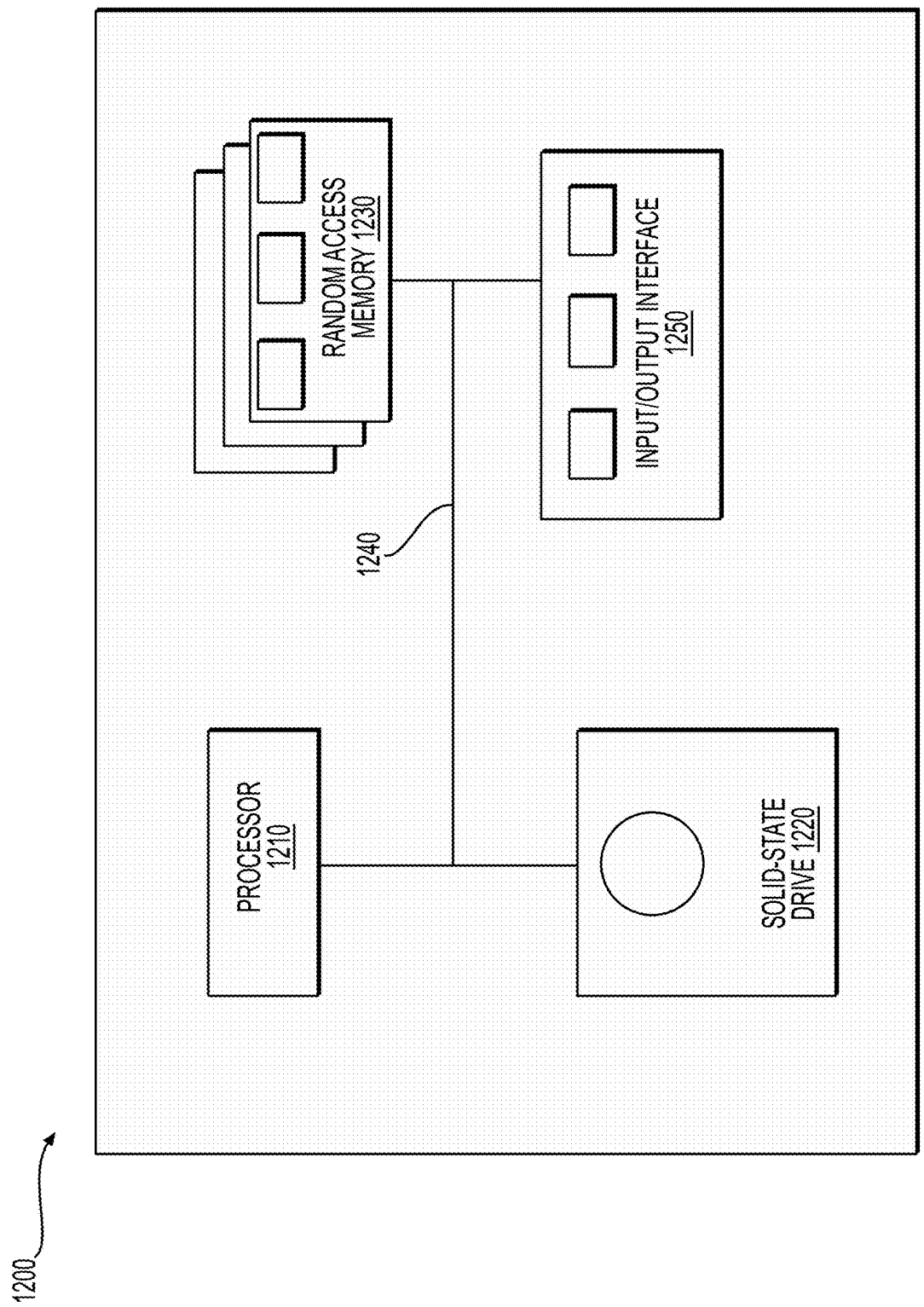
FIG. 12 is an example computing device that may be used to implement any of the methods described herein.

FIG. 12 is an example computing device 1200 that may be used to implement any of the methods described herein. The computing device 1200 comprises various hardware components including one or more single or multi-core processors collectively represented by a processor 1210, a solid-state drive 1220, a random access memory 1230 and an input/output interface 1250. Communication between the various components of the computing device 1200 may be enabled by one or more internal and/or external buses 1240 (e.g. a PCI bus, universal serial bus, IEEE 1394 "Firewire" bus, SCSI bus, Serial-ATA bus, ARINC bus, etc.), to which the various hardware components are electronically coupled.

The random access memory 1230 and/or solid-state drive 1220 are configured in any known manner and arranged to store, among other data, one or more of: set-up data, subject data, subject medical records of one or more subjects, archform image data of the one or more of the subjects, such as 3D archform meshes, and/or orthodontic treatment data.

The input/output interface 1250 allows enabling networking capabilities such as wire or wireless access. As an example, the input/output interface 1250 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 1250 may implement specific physical layer and data link layer standards such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 1220 stores program instructions suitable for being loaded into the random access memory 1230 and executed by the processor 1210, such as for executing the methods described herein according to certain aspects and embodiments of the present technology. For example, the program instructions may be part of a library or an application.

The computing device 1200 may be implemented in a generic computer system which is a conventional computer (i.e. an "off the shelf" generic computer system). The generic computer system may be a desktop computer/personal computer, and/or may be any other type of electronic device such as, but not limited to, a laptop, a mobile device, a smart phone, a tablet device, or a server.

The computing device 1200 may be implemented in a device specifically dedicated to the implementation of the present technology. For example, the computing device 1200 may be implemented in an electronic device such as, but not limited to, a desktop computer/personal computer, a laptop, a mobile device, a smart phone, a tablet device, a server, specifically designed for managing orthodontic treatment, or for making orthodontic appliances for applying the orthodontic treatment. The electronic device may also be configured to operate other devices, such as one or more imaging devices.

The computing device 1200 may be hosted, at least partially, on a server. The computing device 1200 may be partially or totally virtualized through a cloud architecture.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting.

What is claimed is:

1. A method of determining a boundary between a plurality of teeth and gingiva of an archform, the method executable by an electronic device, the method comprising:
   receiving a three-dimensional (3D) digital model of the archform comprising a representation of the gingiva and the plurality of teeth of the archform;
   defining, for each tooth of the plurality of teeth of the archform, a plurality of curves, wherein each curve of the plurality of curves crosses the boundary between the plurality of teeth and the gingiva;
   inputting, to a machine learning algorithm (MLA), the plurality of curves and a plurality of points of each curve of the plurality of curves, wherein the MLA was trained using labeled training data points, and wherein each labeled training data point comprises a location on a corresponding curve and a label indicating whether the location on the corresponding curve corresponds to a boundary between teeth and gingiva on the corresponding curve;
   outputting, by the MLA and for each point of the plurality of points, a predicted likelihood parameter indicating whether each point of the plurality of points corresponds to the boundary between the plurality of teeth and the gingiva of the archform; and
   selecting, for each curve of the plurality of curves, using a smoothing function and the predicted likelihood parameter, a single point, of the plurality of points, on a respective curve as a boundary point corresponding to the boundary between the plurality of teeth and the gingiva of the archform.

2. The method of claim 1, wherein the plurality of curves comprise a plurality of 3D curves, and wherein the method further comprises converting the plurality of curves to two dimensional (2D) curves.

3. The method of claim 2, further comprising determining, for each point of the plurality of points, a respective indication of curvature based on the 2D curves.

4. The method of claim 1, wherein the method further comprises:
   determining that a particular curve of the plurality of curves comprises a loop; and
   omitting the particular curve comprising the loop from further analysis.

5. The method of claim 1, wherein the method further comprises:

determining that a particular curve of the plurality of curves corresponds to two or more teeth; and omitting the particular curve corresponding to the two or more teeth from further analysis.

6. The method claim 1, wherein the method further comprises removing, from each curve of the plurality of curves, a portion of each curve corresponding to a tooth head.

7. The method of claim 3, further comprising inputting, to the MLA and for each point of the plurality of points, the respective indication of curvature.

8. An apparatus comprising:
at least one processor; and
a memory device comprising executable instructions, which, when executed by the at least one processor, cause the apparatus to:
    receive a three-dimensional (3D) digital model of an archform comprising a representation of gingiva and a plurality of teeth of the archform;
    define, for each tooth of the plurality of teeth of the archform, a plurality of curves, wherein each curve of the plurality of curves crosses the boundary between the plurality of teeth and the gingiva;
    input, to a machine learning algorithm (MLA), the plurality of curves and a plurality of points of each curve of the plurality of curves, wherein the MLA was trained using labeled training data points, and wherein each labeled training data point comprises a location on a corresponding curve and a label indicating whether the location on the corresponding curve corresponds to a boundary between teeth and gingiva on the corresponding curve;
    output, by the MLA and for each point of the plurality of points, a predicted likelihood parameter indicating whether each point of the plurality of points corresponds to the boundary between the plurality of teeth and the gingiva of the archform; and
    select, for each curve of the plurality of curves, using a smoothing function and the predicted likelihood parameter, a single point, of the plurality of points, on a respective curve as a boundary point corresponding to the boundary between the plurality of teeth and the gingiva of the archform.

9. The apparatus of claim 8, wherein the executable instructions further cause the apparatus to:
    determine, based on the plurality of curves, average curvature properties corresponding to the plurality of teeth of the archform;
    determine, based on the plurality of curves, average curvature properties corresponding to the gingiva of the archform; and
    input the average curvature properties corresponding to the plurality of teeth and the average curvature properties corresponding to the gingiva to the MLA.

10. The apparatus of claim 8, wherein a first curve of the plurality of curves corresponds to an inner side of a tooth of the plurality of teeth of the archform, and wherein a second curve of the plurality of curves corresponds to an outer side of the tooth.

11. The apparatus of claim 8, wherein the executable instructions further cause the apparatus to determine a derivative of each curve of the plurality of curves.

12. The apparatus of claim 8, wherein the executable instructions that cause the apparatus to select the boundary points comprise executable instructions that cause the apparatus to:
    maximize a sum of the predicted likelihood parameters; and
    minimize a curvature of a particular curve connecting the boundary points.

13. The apparatus of claim 8, wherein the executable instructions further cause the apparatus to:
    determine a particular curve connecting the boundary points; and
    output, for display, the 3D digital model of the archform and the particular curve connecting the boundary points.

14. The apparatus of claim 13, wherein the executable instructions further cause the apparatus to apply a shortest path algorithm to determine the particular curve connecting the boundary points.

15. The apparatus of claim 13, wherein the executable instructions further cause the apparatus to analyze the particular curve connecting the boundary points to interpolate corrective points to a boundary region that has missing boundary points.

16. The apparatus of claim 13, wherein the executable instructions further cause the apparatus to:
    determine a portion of the particular curve connecting the boundary points, the portion corresponding to a given tooth of the plurality of teeth; and
    merge the portion of the particular curve connecting the boundary points between missing boundary points to define the particular curve connecting the boundary points.

17. The apparatus of claim 16, wherein the executable instructions further cause the apparatus to:
    identify closest segments between neighboring portions of the particular curve; and
    apply a shortest path algorithm to the closest segments to smoothen a transition between them to form the particular curve.

18. One or more non-transitory computer-readable media storing executable instructions that, when executed, cause an apparatus to:
    receive a three-dimensional (3D) digital model of an archform comprising a representation of gingiva and a plurality of teeth of the archform;
    define, for each tooth of the plurality of teeth of the archform, a plurality of curves, wherein each curve of the plurality of curves crosses the boundary between the plurality of teeth and the gingiva;
    input, to a machine learning algorithm (MLA), the plurality of curves and a plurality of points of each curve of the plurality of curves, wherein the MLA was trained using labeled training data points, and wherein each labeled training data point comprises a location on a corresponding curve and a label indicating whether the location on the corresponding curve corresponds to a boundary between teeth and gingiva on the corresponding curve;
    output, by the MLA and for each point of the plurality of points, a predicted likelihood parameter indicating whether each point of the plurality of points corresponds to the boundary between the plurality of teeth and the gingiva of the archform; and
    select, for each curve of the plurality of curves, using a smoothing function and the predicted likelihood parameter, a single point, of the plurality of points, on a respective curve as a boundary point corresponding to the boundary between the plurality of teeth and the gingiva of the archform.

19. The one or more non-transitory computer-readable media of claim 18, wherein the instructions, when executed, further cause the apparatus to determine a particular curve connecting the boundary points.

20. The one or more non-transitory computer-readable media of claim 19, wherein the instructions, when executed, further cause the apparatus to apply a shortest path algorithm to determine the particular curve connecting the boundary points.

* * * * *